United States Patent
Shim et al.

(10) Patent No.: US 9,553,298 B2
(45) Date of Patent: Jan. 24, 2017

(54) POUCH TYPE CASE, BATTERY CELL, AND METHOD OF MANUFACTURING BATTERY CELL

(71) Applicant: LG CHEM, LTD., Seoul (KR)

(72) Inventors: Hong Seok Shim, Daejeon (KR); Se Hyun Kim, Daejeon (KR); Min Su Kim, Daejeon (KR); Jung Kyu Woo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 183 days.

(21) Appl. No.: 14/516,221

(22) Filed: Oct. 16, 2014

(65) Prior Publication Data

US 2015/0079435 A1 Mar. 19, 2015

Related U.S. Application Data

(63) Continuation of application No. PCT/KR2014/005018, filed on Jun. 5, 2014.

(30) Foreign Application Priority Data

Sep. 13, 2013 (KR) .................. 10-2013-0110111

(51) Int. Cl.
*H01M 2/36* (2006.01)
*H01M 2/02* (2006.01)
*H01M 10/647* (2014.01)

(52) U.S. Cl.
CPC .......... *H01M 2/361* (2013.01); *H01M 2/0275* (2013.01); *H01M 2/365* (2013.01); *H01M 10/647* (2015.04); *H01M 2220/30* (2013.01); *Y10T 29/4911* (2015.01)

(58) Field of Classification Search
CPC ..................... H01M 10/647; H01M 2/361
See application file for complete search history.

(56) References Cited

U.S. PATENT DOCUMENTS

| | | | |
|---|---|---|---|
| 6,371,996 B1 | 4/2002 | Takayama et al. |
| 6,503,658 B1 | 1/2003 | Klein et al. |
| 8,343,240 B2 | 1/2013 | Shimura et al. |
| 8,785,030 B2 | 7/2014 | Ueda |
| 8,974,549 B2 | 3/2015 | Shimura et al. |
| 2007/0072071 A1 | 3/2007 | Lee |
| 2010/0003583 A1 | 1/2010 | Seong et al. |

(Continued)

FOREIGN PATENT DOCUMENTS

| | | |
|---|---|---|
| JP | 2001-15099 A | 1/2001 |
| JP | 2002-151052 A | 5/2002 |

(Continued)

OTHER PUBLICATIONS

Extended European Search Report for European Application No. 14784182.9, dated Apr. 7, 2016.

(Continued)

*Primary Examiner* — Jeremiah Smith
(74) *Attorney, Agent, or Firm* — Birch, Stewart, Kolasch & Birch, LLP

(57) ABSTRACT

Provided is a pouch type case, which includes a pouch type body part including an inner space for accommodating an electrode assembly, and an injection part extending from the body part to guide electrolyte into the inner space. The injection part is corrugated in a zigzag shape.

9 Claims, 11 Drawing Sheets

(56) References Cited

U.S. PATENT DOCUMENTS

| | | | |
|---|---|---|---|
| 2011/0005050 A1 | 1/2011 | Shimura et al. | |
| 2011/0210954 A1 | 9/2011 | Murphy et al. | |
| 2011/0300437 A1* | 12/2011 | Yi | H01M 2/0212 429/179 |
| 2012/0040235 A1 | 2/2012 | Cho et al. | |
| 2012/0107653 A1* | 5/2012 | Guen | H01M 10/0431 429/72 |
| 2012/0321935 A1 | 12/2012 | Kim et al. | |
| 2013/0061461 A1 | 3/2013 | Shimura et al. | |
| 2013/0093398 A1 | 4/2013 | Takabayashi et al. | |
| 2013/0101884 A1 | 4/2013 | Ueda | |
| 2013/0298388 A1 | 11/2013 | Kim et al. | |

FOREIGN PATENT DOCUMENTS

| | | |
|---|---|---|
| JP | 2005-59870 A | 3/2005 |
| JP | 2005-93261 A | 4/2005 |
| JP | 2007-95707 A | 4/2007 |
| JP | 2008-204754 A | 9/2008 |
| JP | 2009-181862 A | 8/2009 |
| JP | 2000-311661 A | 10/2010 |
| JP | 2010-269838 A | 12/2010 |
| JP | 2013-535791 A | 9/2013 |
| JP | 2014-60016 A | 4/2014 |
| KR | 10-2010-0110150 A | 10/2010 |
| KR | 10-2011-0132856 A | 12/2011 |
| KR | 10-1104146 B1 | 1/2012 |
| KR | 10-2012-0062232 A | 6/2012 |
| KR | 10-2012-0138848 A | 12/2012 |
| TW | 463406 B | 11/2001 |
| TW | 571457 B | 1/2004 |
| TW | 201145643 A1 | 12/2011 |
| TW | 201330358 A1 | 7/2013 |
| WO | WO 2012/140709 A1 | 10/2012 |

OTHER PUBLICATIONS

Taiwan Office Action and Search Report, dated Jul. 31, 2015, for Taiwanese Application No. 103127455, with partial English Translation.

International Search Report for PCT/KR2014/005018 mailed on Sep. 23, 2014.

Written Opinion of the International Searching Authority for PCT/KR2014/005018 mailed on Sep. 23, 2014.

* cited by examiner

POUCH TYPE CASE, BATTERY CELL, AND METHOD OF MANUFACTURING BATTERY CELL

CROSS-REFERENCE TO RELATED APPLICATIONS

This application is a Continuation of PCT International Application No. PCT/KR2014/005018, filed on Jun. 5, 2014, which claims priority under 35 U.S.C. 119(a) to Patent Application No. 10-2013-0110111, filed in the Republic of Korea on Sep. 13, 2013, all of which are hereby expressly incorporated by reference into the present application.

BACKGROUND OF THE INVENTION

Field of the Invention

The present invention relates to a pouch type case including an electrolyte injection part corrugated in a zigzag shape, a battery cell including the pouch type case, and a method of manufacturing a battery cell.

Description of the Related Art

Batteries generate electric energy through a chemical or physical reaction. Such chemical batteries are classified into primary batteries and secondary batteries. In particular, the primary batteries are not rechargeable, examples of which include manganese batteries, alkaline batteries, and mercury batteries, and the secondary batteries are rechargeable, examples of which include rechargeable batteries and lead storage batteries.

As portable electronic devices, such as cellular phones, PDAs, smart phones, and notebook computers come into wide use, technical developments of secondary batteries, which can be used for a long time on a single charge and have long service life, are needed.

Such a secondary battery is provided in a battery cell form in which a plurality of cells, that is, a plurality unit batteries are connected to each other according to charging/discharging efficiency or current capacity. Lithium secondary batteries having advantages such as high energy density, lightness, high voltage, non-pollution, high power, quick charge, and long service life are currently popular.

The above described battery cell form is disclosed in detail in Korean Patent Publication No. 10-2012-0061354.

That is, referring to FIG. 1, a pouch type battery cell 10 in the related art includes a pouch type case 20 and an electrode assembly 30.

The pouch type case 20 has a structure in which upper and lower cases 21 and 22 are brought into tight contact with and are coupled to each other.

The electrode assembly 30 has a structure in which unit cells A are repeatedly stacked. The unit cells A include a cathode plate, an anode plate, and a separator disposed between the cathode plate and the anode plate. The cathode plate is provided with a cathode tab, and the anode plate is provided with an anode tab.

The pouch type battery cell 10 configured as described above is completed by putting the electrode assembly 30 in the pouch type case 20, injecting electrolyte therein, and then, performing a sealing process and a post-treatment process.

Referring to FIG. 2, the pouch type case 20 is provided with an injection part 23 for facilitating the injecting of the electrolyte, and the injection part 23 is elongated from a non-sealing surface of the pouch type case 20.

After the electrolyte is injected into the pouch type case 20, the pouch type battery cell 10 is put in a vacuum chamber (not shown) to perform an impregnating process. At this point, the pouch type case 20 is compressed by inner pressure of the vacuum chamber, and the electrolyte injected in the pouch type case 20 is easily discharged to the outside through the injection part 23.

Moreover, since the injection part 23 of the pouch type case 20 is vertically elongated, the injection part 23 is easily compressed by the inner pressure of the vacuum chamber, and the electrolyte is easily discharged to the outside.

SUMMARY OF THE INVENTION

Accordingly, the present invention aims at providing a pouch type case and a battery cell including the pouch type case, which improves a shape of an injection part provided on the pouch type case to prevent electrolyte from being easily discharged to the outside.

A pouch type case according to the present invention includes an injection part that is corrugated in a zigzag shape. Accordingly, strength and a ground area of the injection part are increased to prevent electrolyte from being discharged to the outside.

According to an aspect of the present invention, there is provided a pouch type case including: a pouch type body part including an inner space for accommodating an electrode assembly; and an injection part extending from the body part to guide electrolyte into the inner space, wherein the injection part is corrugated in a zigzag shape.

The injection part may be corrugated in a zigzag shape in an electrolyte injection direction of the electrolyte.

The injection part may be removed from the body part after the electrode assembly is impregnated with the electrolyte.

A portion of the body part from which the injection part is removed may be sealed to form a sealing surface.

The injection part may be corrugated and integrally formed with the body part when a border of the body part is sealed.

A sealing surface may be formed on three continuous surfaces of four surfaces of the body part, and a non-sealing surface provided with the injection part may be formed on the other surface of the four surfaces.

The injection part may be corrugated and extended in a zigzag shape from the non-sealing surface.

According to another aspect of the present invention, there is provided a battery cell, which includes a pouch type case, an electrode assembly provided in the pouch type case, and electrolyte.

A method of manufacturing the battery cell including the pouch type case may includes: manufacturing the pouch type case for accommodating the electrode assembly; injecting the electrolyte through the injection part of the pouch type case; putting the pouch type case in a vacuum chamber to impregnate the electrode assembly with the electrolyte; sealing an area between the body part and the injection part of the pouch type case; and cutting and removing the injection part from the body part of the pouch type case.

The manufacturing of the pouch type case may include: disposing film type pouches on upper and lower parts of the electrode assembly, respectively, to form a pouch assembly; and sealing the whole border of the pouch assembly except for a side part thereof and simultaneously pressing upper and lower surfaces of the unsealed side part to form the injection part corrugated in the zigzag shape.

According to the present invention, a pouch type case includes an injection part that is corrugated in a zigzag shape. Thus, even when pressure of a vacuum chamber is

BRIEF DESCRIPTION OF THE DRAWINGS

FIGS. 7 to 11 are views illustrating a method of manufacturing a battery cell according to an embodiment of the present invention: in which FIG. 7 is a perspective view illustrating a process of manufacturing a pouch type case including an injection part, FIG. 8 is a cross-sectional view illustrating an electrode assembly and a process of injecting electrolyte, FIG. 9 is a cross-sectional view illustrating an impregnating process. FIG. 10 is a cross-sectional view illustrating a process of sealing an area between a body part of the pouch type case and the injection part, and FIG. 11 is a cross-sectional view illustrating a process of completing the battery cell by cutting the injection part.

DETAILED DESCRIPTION OF THE EXEMPLARY EMBODIMENT

Figure 1:
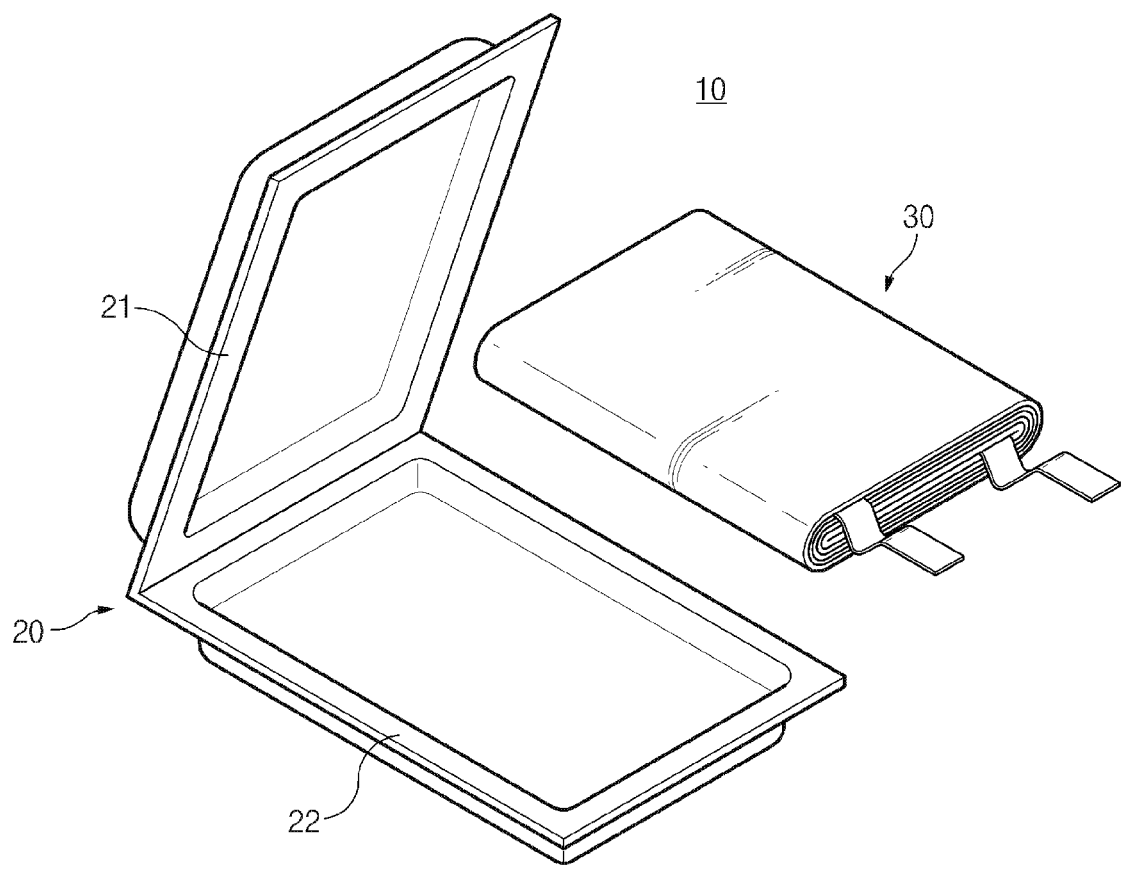
FIG. 1 is a perspective view illustrating a battery cell in the related art.
Figure 2:
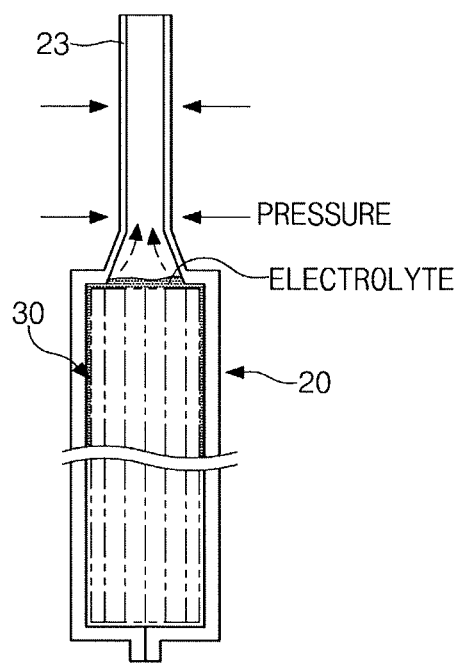
FIG. 2 is a cross-sectional view illustrating a pouch type case including an injection part in the related art.

A pouch type case according to the present invention includes an injection part for injecting electrolyte, and the injection part is corrugated in a zigzag shape. Accordingly, strength and a ground area of the injection part are increased to prevent the electrolyte from being discharged to the outside.

Hereinafter, embodiments according to the present invention will be described in detail with reference to the accompanying drawings such that those skilled in the art to which the present invention belongs can realize the present invention without difficulty. The present invention may, however, be embodied in different forms and should not be construed as limited to the embodiments set forth herein. In the drawings, anything unnecessary for describing the present invention will be omitted for clarity. Like reference numerals denote like elements throughout.

Pouch Case According to Embodiment of the Present Invention

Figure 3:
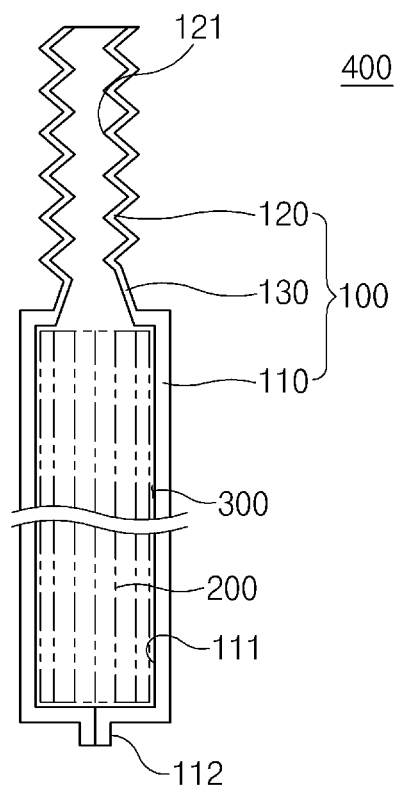
FIG. 3 is a cross-sectional view illustrating a pouch type case including an injection part according to an embodiment of the present invention.
Figure 4:
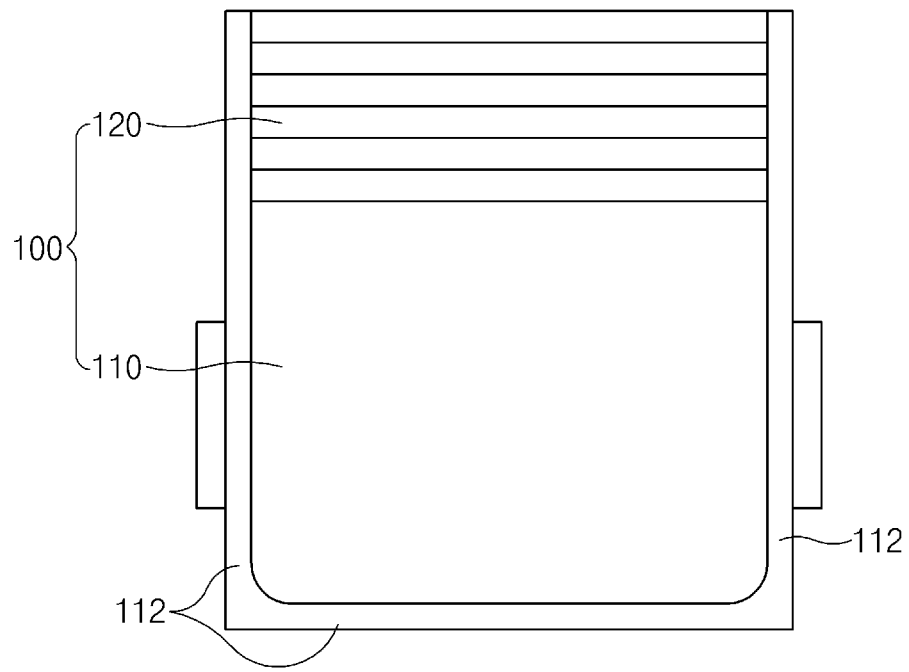
FIG. 4 is a front view illustrating a pouch type case including an injection part according to an embodiment of the present invention.

Referring to FIGS. 3 and 4, a pouch type case 100 according to an embodiment of the present invention includes a pouch type body part 110 including an inner space 111 for accommodating an electrode assembly 200, and an injection part 120 extending from the body part 110 to guide electrolyte (not shown) into the inner space 111.

The body part 110 includes the inner space ill for accommodating the electrode assembly 200. A sealing surface 112 is formed on three continuous surfaces of an outer border of the body part 110, and a non-sealing surface provided with the injection part 120 is formed on the other surface.

Figure 5:
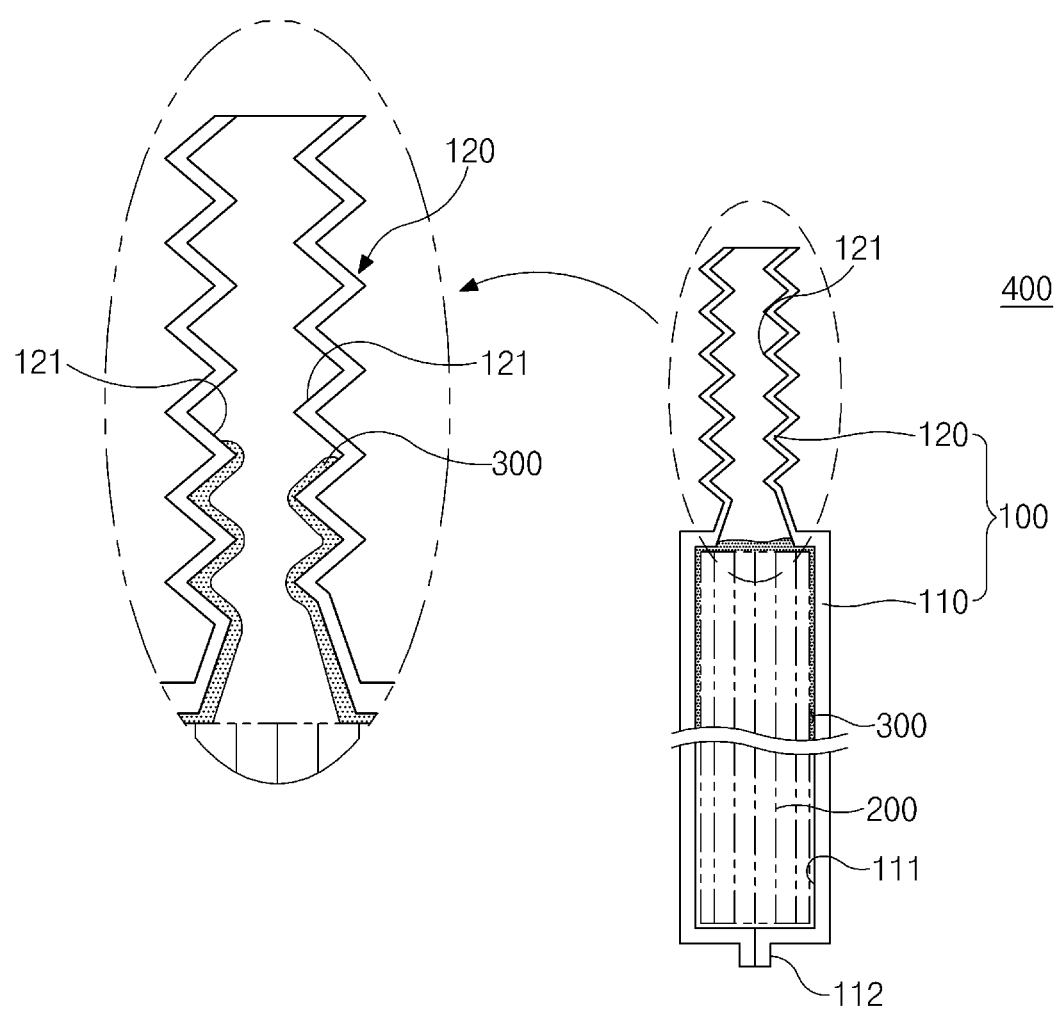
FIG. 5 is a cross-sectional view illustrating a pouch type case including an injection part with a partial enlarged view illustrating the injection part, according to an embodiment of the present invention.

Referring to FIG. 5, the injection part 120 is corrugated and extended in a zigzag shape from the non-sealing surface of the body part 110. That is, the injection part 120 is corrugated in a zigzag shape in an electrolyte injection direction, so that strength and a ground area of the injection part 120 are increased to prevent the electrolyte from being discharged to the outside.

That is, referring to FIG. 5, the injection part 120 is folded to be corrugated in a zigzag shape to increase the strength and the ground area thereof. Accordingly, the injection part 120 is prevented from being easily compressed by external pressure, so as to delay and prevent a discharge of electrolyte 300 to the outside. Moreover, the injection part 120 prevents ascent of the electrolyte 300 by means of protrusions 121 that are folded to be inwardly and downwardly inclined, thereby decreasing an ascending speed of the electrolyte 300 and preventing a discharge of the electrolyte 300 to the outside.

After an impregnating process on the electrolyte 300 and the electrode assembly 200, the injection part 120 may be removed from the body part 110, so that a battery cell has a finished shape. That is, the electrolyte 300 is injected through the injection part 120, and the injection part 120 prevents the electrolyte 300 from being discharged to the outside in the impregnating process. Thus, when the impregnating process is completed, the injection part 120 is removed from the body part 110 of the pouch type case 100 to optimize the size of the pouch type case 100.

Then, a portion of the body part 110 from which the injection part 120 is removed is sealed to form a sealing surface. Accordingly, the body part 110 is entirely sealed to prevent a discharge of the electrolyte 300.

A sealing part 130 may be formed between the body part 110 and the injection part 120 and have a flat shape, not a corrugated zigzag shape, to improve sealing force.

That is, the sealing part 130 is sealed before the injection part 120 is removed, so that the injection part 120 can be more stably removed, and the sealing part 130 prevents a discharge of the electrolyte 300 to the outside.

In a method of manufacturing the pouch type case 100 configured as described above according to the current embodiment, two film type pouches are disposed with the electrode assembly 200 therebetween, and then, the side surfaces of the film type pouches are sealed except for a side surface thereof to form the body part 110 for accommodating the electrode assembly 200, and simultaneously, the unsealed side surface is pressed to form the injection part 120 that is corrugated in a zigzag shape.

At this point, the injection part 120 is corrugated in a zigzag shape as illustrated in FIG. 5, that is, in a zigzag shape in the electrolyte injection direction. Accordingly, the strength and the area of the injection part 120 are increased, and the electrolyte 300 is prevented from being discharged to the outside by the protrusions 121 protruding in zigzag shape.

Thus, according to the current embodiment, even when the body part 110 and the injection part 120 of the pouch type case 100 are pressed, since the injection part 120 is corrugated in a zigzag shape, the body part 110 and the injection part 120 are not easily compressed, and the ground area of the injection part 120 is significantly increased. In addition, the electrolyte 300 is blocked in a multi-stage manner by the protrusions 121 protruding to the inside of the injection part 120 and is thus prevented from being discharged to the outside.

Furthermore, the injection part 120 is formed simultaneously with sealing of the border of the body part 110 is thus easy to manufacture, thereby improving efficiency.

A battery cell 400 including the pouch type case 100 configured as described above may be manufactured.

Battery Cell According to Embodiment of the Present Invention

Referring to FIG. 3, the battery cell 400 according to an embodiment of the present invention includes the pouch type case 100 including the injection part 120, the electrode assembly 200, and the electrolyte 300, which are accommodated therein through the injection part 120 of the pouch type case 100.

Figure 11:
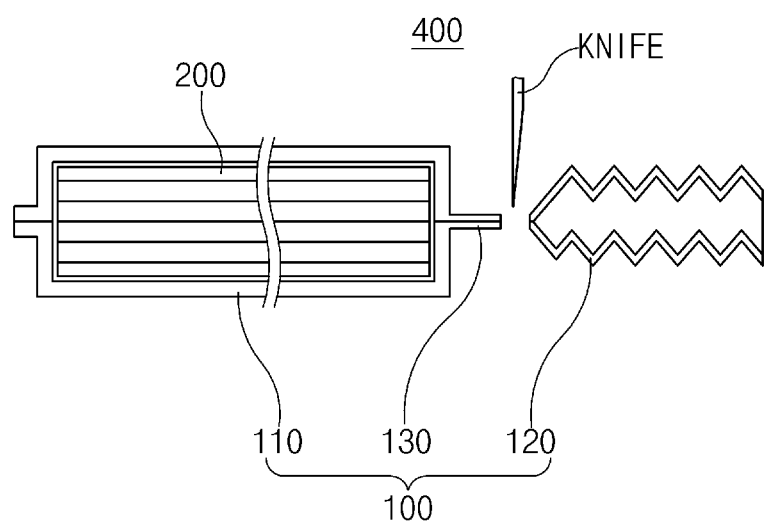

After the impregnating process on the electrolyte 300 and the electrode assembly 200 accommodated in the pouch type case 100, the injection part 120 is removed from the body part 110 of the pouch type case 100, so that the battery cell 400 can be completed as a finished product (refer to FIG. 11).

Hereinafter, a method of manufacturing a battery cell configured as described above will now be described according to an embodiment of the present invention.

Figure 6:
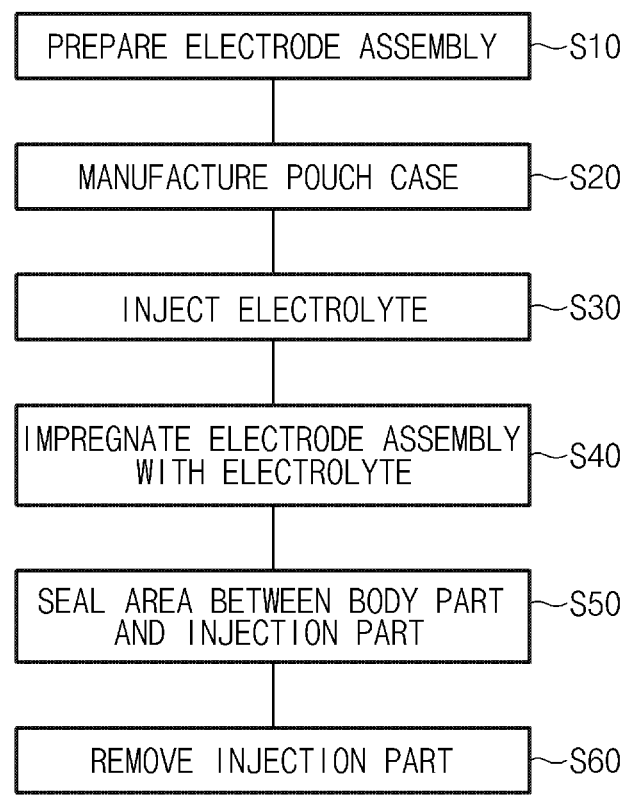
FIG. 6 is a flowchart illustrating a method of manufacturing a battery cell including a pouch type case including an injection part according to an embodiment of the present invention.

Method of Manufacturing Battery Cell According to Embodiment of the Present Invention Referring to FIG. 6, a method of manufacturing a battery cell according to an embodiment of the present invention includes preparing the electrode assembly 200 (S10), manufacturing the pouch type case 100 to accommodate the electrode assembly 200 (S20), injecting the electrolyte 300 through the injection part 120 of the pouch type case 100 (S30), putting the pouch type case 100 in a vacuum chamber 500 to impregnate the electrode assembly 200 with the electrolyte 300 (S40), sealing an area between the injection part 120 and the body part 110 of the pouch type case 100 (S50), and cutting the injection part 120 from the body part 110 of the pouch type case 100 (S60).

Hereinafter, the method of manufacturing a battery cell according to the current embodiment will be described in detail with reference to FIGS. 7 to 11.

In the preparing of the electrode assembly 200 (S10), the electrode assembly 200 is manufactured by repeatedly stacking unit cells, which include a cathode plate, an anode plate, and a separator disposed between the cathode plate and the anode plate to electrically insulate the cathode plate and the anode plate from each other.

An electrode assembly manufactured and prepared as described above is any one of a jelly roll type electrode assembly formed by sequentially stacking one or more anodes, one or more separators, and one or more cathodes and winding the anodes, the separators, and the cathodes; a stack & folding type electrode assembly formed by disposing a unit cell formed by sequentially stacking an anode, a separator, and a cathode, on a long film type separator, and then, winding the unit cell in one direction; a stack & folding type electrode assembly formed by disposing a unit cell formed by sequentially stacking an anode, a separator, and a cathode, on a long film type separator, and then, winding the unit cell in zigzag directions; and an electrode assembly including a unit body stack formed by stacking one or more basic unit bodies prepared by sequentially stacking an anode, a separator, a cathode, and a separator.

When an electrode assembly is prepared as described above, the pouch type case 100 is manufactured (S20).

Figure 7:
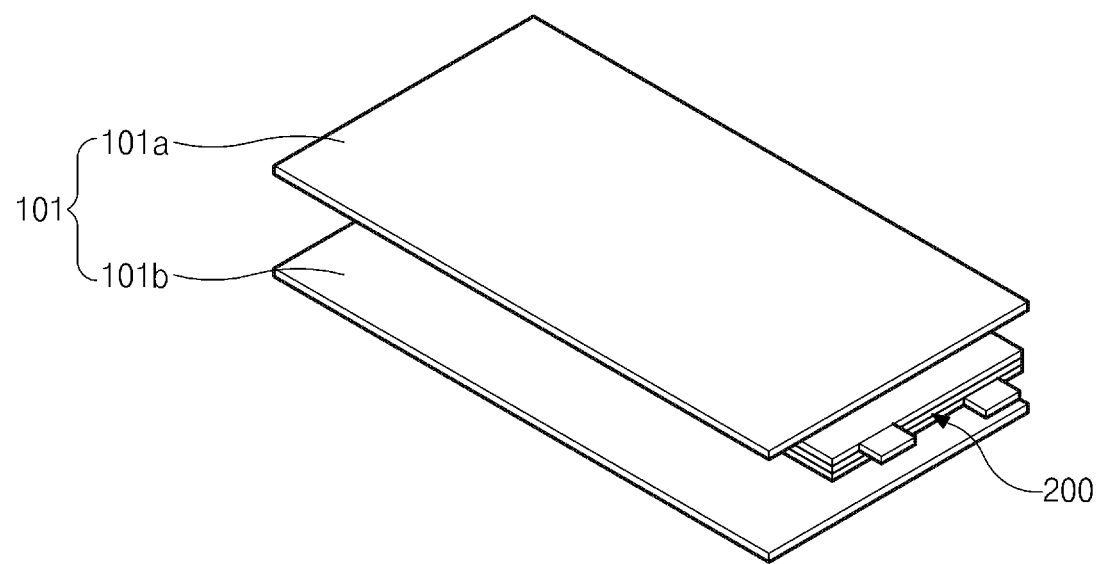

Referring to FIG. 7, the manufacturing of the pouch type case 100 (S20) includes disposing film type pouches 101a and 101b for forming a pouch assembly 101, sealing the pouch assembly 101, and forming the injection part 120.

That is, the film type pouches 101a and 101b are disposed on the upper and lower parts of the electrode assembly 200, respectively, to form the pouch assembly 101. At this point, the electrode assembly 200 is disposed at the opposite side to a side of the pouch assembly 101 which will be described later. Then, the pouch assembly 101 is sealed, and the injection part 120 is formed.

At this point, the side surfaces of the border of the pouch assembly 101 are sealed except for a side surface thereof, so as to form the body part 110 accommodating the electrode assembly 200, and the upper and lower parts of the unsealed side surface are simultaneously pressed to form the injection part 120 corrugated in a zigzag shape. Accordingly, the pouch type case 100 is completed as illustrated in FIG. 3.

Then, the electrolyte 300 is injected (S30).

Figure 8:
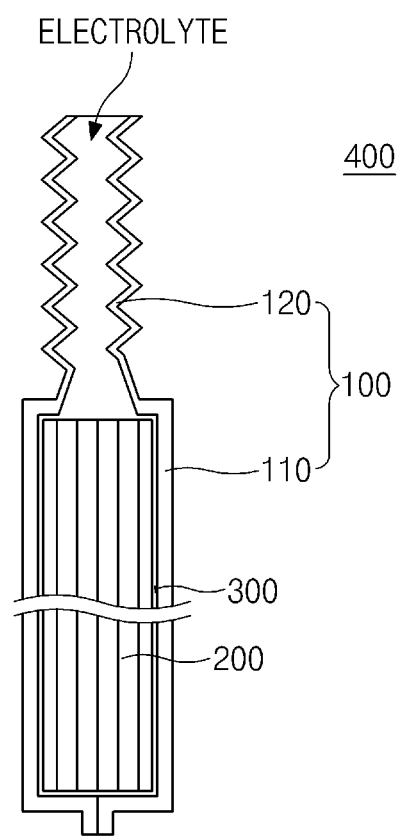

At this point, referring to FIG. 8, the pouch type case 100 is disposed to orient the injection part 120 upward, and then, the electrolyte 300 is injected into the body part 110 through the injection part 120. Accordingly, the electrode assembly 200 accommodated in the body part 110 is impregnated with the electrolyte 300.

The pouch type case 100 is put in the vacuum chamber 500 to improve impregnation efficiency of the electrode assembly 200 with the electrolyte 300 (S40).

Figure 9:
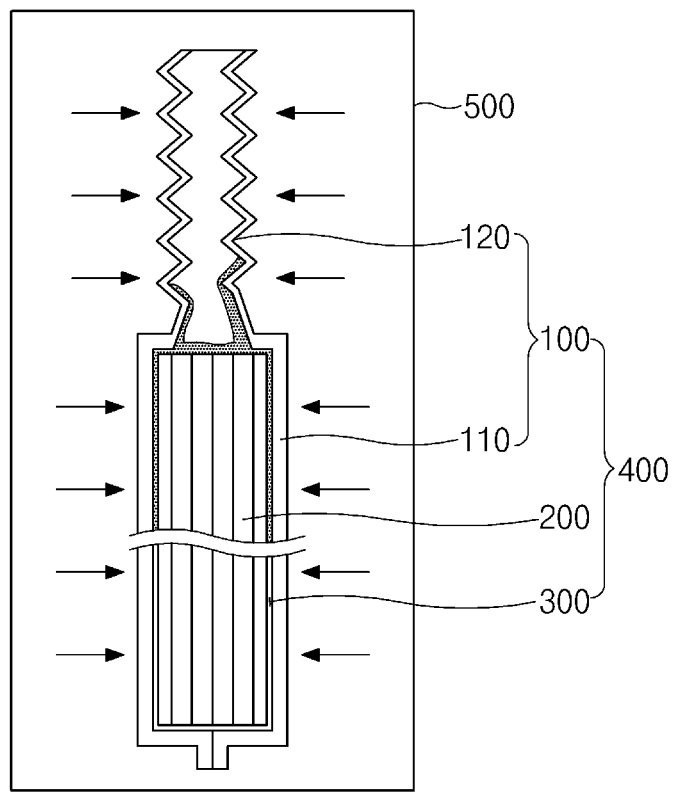

At this point, referring to FIG. 9, the pouch type case 100 is put in the vacuum chamber 500 with the injection part 120 oriented upward, and then, the vacuum chamber 500 is operated. Then, inner pressure of the vacuum chamber 500 increases to press the pouch type case 100, thereby improving the impregnation efficiency of the electrode assembly 200 with the electrolyte 300.

As the inner pressure of the vacuum chamber 500 compresses the pouch type case 100, the electrolyte 300 injected into the pouch type case 100 is gradually introduced into the injection part 120 and is moved upward. At this point, the injection part 120 corrugated into a zigzag shape decreases an ascending speed of the electrolyte 300. Moreover, the protrusions 121 protruding to the inside of the injection part 120 block the electrolyte 300 so as to further decrease the ascending speed of the electrolyte 300.

That is, since the electrolyte 300 is prevented from being discharged to the outside, the inner pressure of the vacuum chamber 500 can be increased, to thereby improve the impregnation efficiency.

When the impregnating of the electrode assembly 200 with the electrolyte 300 is completed as described above, a non-sealing surface of the pouch type case 100 connected to the injection part 120 is sealed (S50).

Figure 10:
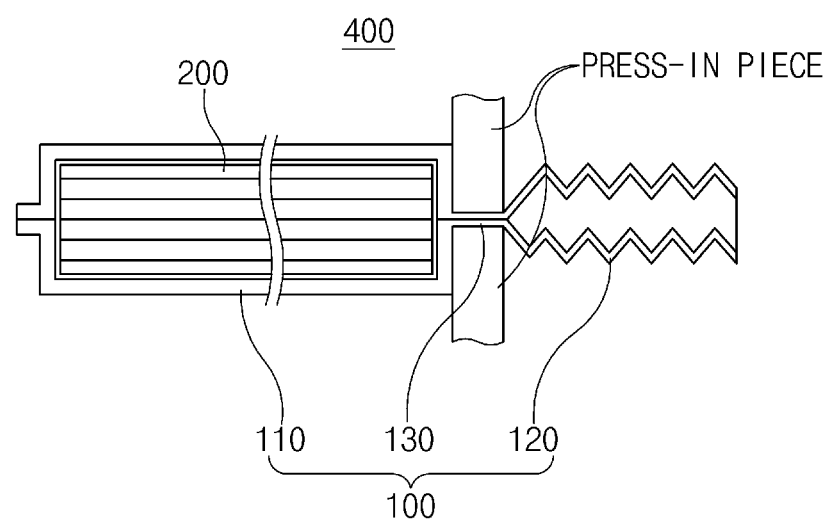

At this point, referring to FIG. 10, the area between the body part 110 and the injection part 120 of the pouch type case 100 is pressed and sealed using a press-in piece that is heated at a high temperature. Accordingly, the whole border of the pouch type case 100 is sealed.

The sealing of the area (S50) is facilitated by the sealing part 130 that is flat between the body part 110 and the injection part 120.

When the sealing of the area (S50) is completed as described above, the injection part 120 is cut and removed (S60).

At this point, referring to FIG. 11, the injection part 120 is cut from the body part 110 of the pouch type case 100 by using a knife. The injection part 120 may be cut and removed simultaneously with the sealing of the non-sealing surface of the body part 110

When the injection part 120 is removed as described above, the battery cell 400 is completed as a finished product.

Thus, when the pouch type case 100 is manufactured in the method of manufacturing a battery cell according to the current embodiment, the injection part 120 is corrugated in a zigzag shape, thereby significantly preventing the electrolyte 300 from being discharged to the outside while impregnating the electrode assembly 200 with the electrolyte 300. Accordingly, quality of the battery cell 400 can be increased, and work time can be significantly decreased to improve productivity.

The invention claimed is:

1. A pouch type case comprising:
a pouch type body part including an inner space accommodating an electrode assembly; and
an injection part extending from the body part to guide electrolyte into the inner space, wherein the injection part is corrugated in a zigzag shape, and
wherein inner and outer surfaces of the injection part are corrugated so that the injection part is compressible along an axial direction of the injection part.

2. The pouch type case of claim 1, wherein the injection part is corrugated in a zigzag shape in an electrolyte injection direction of the electrolyte.

3. The pouch type case of claim 1, wherein the injection part is removed from the body part after the electrode assembly is impregnated with the electrolyte.

4. The pouch type case of claim 3, wherein a portion of the body part from which the injection part is removed is sealed to form a sealing surface.

5. The pouch type case of claim 1, wherein the body part includes a non-corrugation sealing part between the body part and the injection part.

6. The pouch type case of claim 1, wherein the injection part is corrugated and integrally formed with the body part when a border of the body part is sealed.

7. The pouch type case of claim 1, wherein a sealing surface is formed on three continuous surfaces of four surfaces of the body part, and a non-sealing surface provided with the injection part is formed on the other surface of the four surfaces.

8. The pouch type case of claim 7, wherein the injection part is corrugated and extended in a zigzag shape from the non-sealing surface.

9. The pouch type case of claim 1, wherein the injection part is integrally formed with the body part before the body part is sealed.

* * * * *